(12) United States Patent
Burch et al.

(10) Patent No.: US 8,707,564 B2
(45) Date of Patent: Apr. 29, 2014

(54) HAND SAW

(75) Inventors: Wade Burch, Wauwatosa, WI (US);
Michael S. Steele, Waukesha, WI (US);
Jason R. Crowe, Milwaukee, WI (US);
Michael Naughton, Dousman, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 692 days.

(21) Appl. No.: 12/701,328

(22) Filed: Feb. 5, 2010

(65) Prior Publication Data

US 2010/0192382 A1 Aug. 5, 2010

Related U.S. Application Data

(60) Provisional application No. 61/150,156, filed on Feb. 5, 2009, provisional application No. 61/219,615, filed on Jun. 23, 2009.

(51) Int. Cl.
*B26B 3/06* (2006.01)

(52) U.S. Cl.
USPC .................... 30/155; 30/158; 30/160; 30/351

(58) Field of Classification Search
USPC ............ 30/161, 160, 158, 157, 155, 331, 351
See application file for complete search history.

(56) References Cited

U.S. PATENT DOCUMENTS

| | | | |
|---|---|---|---|
| 284,793 A * | 9/1883 | Allaben | 83/837 |
| 289,104 A | 11/1883 | How | |
| 297,816 A * | 4/1884 | Ledward | 83/837 |
| 300,805 A * | 6/1884 | Scott | 83/837 |
| 1,368,441 A | 2/1921 | Kleinman | |
| 2,659,398 A * | 11/1953 | Marvin | 83/837 |
| 3,061,927 A | 11/1962 | Von Frankenberg und Ludwigsdorf | |
| 3,299,917 A * | 1/1967 | Pearson | 83/837 |
| 3,519,040 A * | 7/1970 | Demsky | 83/837 |

(Continued)

FOREIGN PATENT DOCUMENTS

| | | |
|---|---|---|
| DE | 19808705 | 9/1999 |
| JP | 4035901 | 2/1992 |
| WO | 2006/049608 | 5/2006 |

OTHER PUBLICATIONS

PCT/US2010/023364 International Search Report and Written Opinion dated Mar. 31, 2010 (8 pages).

(Continued)

*Primary Examiner* — Omar Flores Sanchez
(74) *Attorney, Agent, or Firm* — Michael Best & Friedrich LLP

(57) ABSTRACT

A hand saw includes a saw blade, a handle, and a blade carrier. The saw further includes a blade clamp assembly having a locking member that removably couples the saw blade to the blade carrier so that the saw blade pivots with the blade carrier about a pivot axis. An actuating button is manually movable generally transverse to a longitudinal axis of the saw blade by the user between an engaged position and a disengaged position. In the engaged position, the actuating button engages the blade carrier to retain the blade carrier and the saw blade in one of an extended position and a folded position. In the disengaged position, the actuating button is disengaged from the blade carrier so that the blade carrier and the saw blade can be pivoted between the extended and the folded positions of the saw blade.

14 Claims, 5 Drawing Sheets

(56) References Cited

U.S. PATENT DOCUMENTS

| | | | |
|---|---|---|---|
| 3,521,684 A * | 7/1970 | Mcrobert et al. | 83/837 |
| 3,730,038 A * | 5/1973 | Farb | 83/837 |
| 3,851,986 A | 12/1974 | Daughtry | |
| 3,896,546 A | 7/1975 | Hildebrandt | |
| 4,148,140 A | 4/1979 | Lile | |
| 4,233,737 A | 11/1980 | Poehlmann | |
| 4,660,284 A | 4/1987 | Decarolis | |
| 4,918,820 A | 4/1990 | Korb et al. | |
| 5,291,725 A * | 3/1994 | Meinerding | 56/295 |
| 5,293,690 A | 3/1994 | Cassady | |
| 5,515,670 A * | 5/1996 | Meinerding | 56/295 |
| 5,553,386 A * | 9/1996 | Hsu | 30/161 |
| 5,661,908 A * | 9/1997 | Chen | 30/125 |
| 5,722,168 A | 3/1998 | Huang | |
| 5,802,947 A * | 9/1998 | Ward et al. | 83/835 |
| 5,964,035 A | 10/1999 | Poehlmann | |
| 5,966,816 A | 10/1999 | Roberson | |
| 5,971,403 A | 10/1999 | Yahagi et al. | |
| 5,979,065 A | 11/1999 | Hsu | |
| 6,134,788 A | 10/2000 | Chen et al. | |
| 6,145,426 A * | 11/2000 | Ward et al. | 83/835 |
| 6,276,065 B1 | 8/2001 | Osada et al. | |
| 6,357,122 B2 | 3/2002 | Bachta | |
| 6,446,341 B1 | 9/2002 | Wang et al. | |
| 6,532,855 B1 * | 3/2003 | Ward et al. | 83/835 |
| 6,574,869 B1 * | 6/2003 | McHenry et al. | 30/161 |
| 6,729,028 B1 | 5/2004 | Hsu | |
| 6,729,029 B1 | 5/2004 | Chu | |
| 6,886,261 B2 | 5/2005 | Haut | |
| 6,893,026 B2 | 5/2005 | Yoshimura et al. | |
| 7,000,323 B1 | 2/2006 | Hatcher et al. | |
| 7,134,207 B2 | 11/2006 | Ping | |
| 7,340,836 B2 | 3/2008 | Whitemiller et al. | |
| 7,370,421 B2 | 5/2008 | Onion et al. | |
| 7,380,341 B2 | 6/2008 | Ping | |
| 7,451,677 B2 | 11/2008 | Souza et al. | |
| RE41,259 E * | 4/2010 | McHenry et al. | 30/161 |
| 7,748,122 B2 * | 7/2010 | Duey | 30/159 |
| 8,171,645 B2 * | 5/2012 | Duey | 30/159 |
| 2003/0024354 A1 | 2/2003 | Ward et al. | |
| 2007/0256304 A1 | 11/2007 | Pardue et al. | |
| 2008/0083119 A1 | 4/2008 | Schmidt | |
| 2008/0222896 A1 | 9/2008 | Marfione et al. | |
| 2008/0301949 A1 | 12/2008 | Enga et al. | |
| 2009/0119927 A1 | 5/2009 | Chen | |
| 2009/0277022 A1 * | 11/2009 | Limberg et al. | 30/392 |

OTHER PUBLICATIONS

Office Action from the Canadian Intellectual Property Office for Application No. 2751464 dated Mar. 26, 2013 (3 pages).
EP10739185.6 Extended European Search Report dated Jun. 5, 2013 (12 pages).
Office Action from the Australian Patent Office for Application No. 2010210494 dated Nov. 10, 2012 (4 pages).
Office Action from the Canadian Intellectual Property Office for Canadian Application No. 2,751,464 dated Dec. 30, 2013 (5 pages).
Australian Patent Examination Report No. 3 for Australian Application No. 2010210494 dated Dec. 18, 2013 (5 pages).

* cited by examiner

HAND SAW

CROSS-REFERENCE TO RELATED APPLICATIONS

This application claims priority to U.S. Provisional Patent Application No. 61/150,156, filed Feb. 5, 2009 and U.S. Provisional Patent Application No. 61/219,615, filed Jun. 23, 2009, the entire contents of which are all incorporated by reference herein.

BACKGROUND

The present invention relates to saw, and more particularly to hand saws

Hand saws typically include a handle or frame and a blade that attaches to the handle. The user typically grasps the handle to reciprocate the blade to cut a workpiece. The blade is typically removably coupled to the handle so that the blade can be removed if the blade becomes worn, dull, or if the blade breaks. Some hand saws include the blade pivotally coupled to the handle so that the user can pivot the blade between an extended position and a folded position. The user can place the blade in the folded position when the saw is not in use to minimize the space necessary to store the saw and to protect the blade from damage.

SUMMARY

In one construction, the invention provides a hand saw that includes a saw blade having a first end, a second end, a longitudinal axis that extends through the first end and the second end, and an aperture adjacent the first end. The saw further includes a handle configured to be grasped by a user to reciprocate the saw blade along the longitudinal axis to cut a workpiece. The handle defines an inner cavity. A blade carrier is coupled to the handle such that the blade carrier is pivotable with respect to the handle about a pivot axis. The blade carrier defines at least a portion of a blade receiving slot that receives the first end of the saw blade. The saw further includes a blade clamp assembly having a locking member movably coupled to the handle. The locking member extends into the blade receiving slot and at least partially into the aperture of the saw blade to removably couple the saw blade to the blade carrier so that the saw blade pivots with the blade carrier about the pivot axis. An actuating button is manually movable generally transverse to the longitudinal axis of the saw blade by the user between an engaged position and a disengaged position. In the engaged position of the actuating button, the actuating button engages the blade carrier to retain the blade carrier and the saw blade in one of an extended position and a folded position. In the extended position, the saw blade extends from the handle so that the saw blade can be used to cut the workpiece, and in the folded position the saw blade is at least partially received within the inner cavity of the handle for storage. In the disengaged position of the actuating button, the actuating button is disengaged from the blade carrier so that the blade carrier and the saw blade can be pivoted between the extended and the folded positions of the saw blade.

In another construction, the invention provides a hand saw that includes a saw blade having a first end, a second end, a longitudinal axis that extends through the first end and the second end, an aperture adjacent the first end, and a plurality of teeth configured to cut a workpiece. The saw further includes a handle configured to be grasped by a user to reciprocate the saw blade along the longitudinal axis to cut the workpiece. The handle includes a bottom side configured to generally face the workpiece when the workpiece is being cut by the saw blade, a top side opposite the bottom side and the top side configured to generally face away from the workpiece when the workpiece is being cut by the saw blade, a first side that connects the bottom side and the top side, and a second side opposite the first side and that connects the bottom side and the top side. A blade carrier is coupled to the handle such that the blade carrier is pivotable with respect to the handle about a pivot axis. The blade carrier defines at least a portion of a blade receiving slot that receives the first end of the saw blade. The saw further includes a blade clamp assembly having a locking member and a release member. The locking member is extendable into the blade receiving slot and at least partially into the aperture of the saw blade to removably couple the saw blade to the blade carrier so that the saw blade pivots with the blade carrier about the pivot axis. The release member is manually movable by the user from a first position to a second position such that in the first position, the release member engages the locking member to retain the locking member in the locked position and in the second position, the locking member is movable to the unlocked position. An actuating button is manually movable by the user between an engaged position and a disengaged position such that in the engaged position the actuating button engages the blade carrier to retain the blade carrier and the saw blade in an extended position or a folded position, and in the disengaged position, the actuating button is disengaged from the blade carrier so that the blade carrier and the saw blade can pivot between the extended and the folded positions of the saw blade. The release member is coupled to the handle such that the release member moves from one of the top side and the bottom side toward the other of the top side and the bottom side when the release member moves from the first position toward the second position. The actuating button is coupled to the handle such that the actuating button moves from the first side toward the second side when the actuating button moves from the engaged position to the disengaged position.

In yet another construction, the invention provides a saw blade for use with a hand saw. The saw blade includes a first end, a second end, and a longitudinal axis that extends through the first end and the second end. An aperture is adjacent the first end and the aperture is configured to couple the saw blade to the saw. The blade further includes a top edge that extends from the first end to the second end, a bottom edge that extends from the first end to the second end opposite the top edge. The bottom edge includes a plurality of teeth configured to cut a workpiece when the saw blade is reciprocated along the longitudinal axis. A first side wall extends from the top edge to the bottom edge and from the first end to the second end. A second side wall, opposite the first side wall, extends from the top edge to the bottom edge and from the first end to the second end. The blade further includes a plurality of projections that extend outwardly from the first side wall between the top edge and the bottom edge and between the first end and the second end. The plurality of projections are configured to rasp the workpiece when the saw blade is reciprocated along the longitudinal axis.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
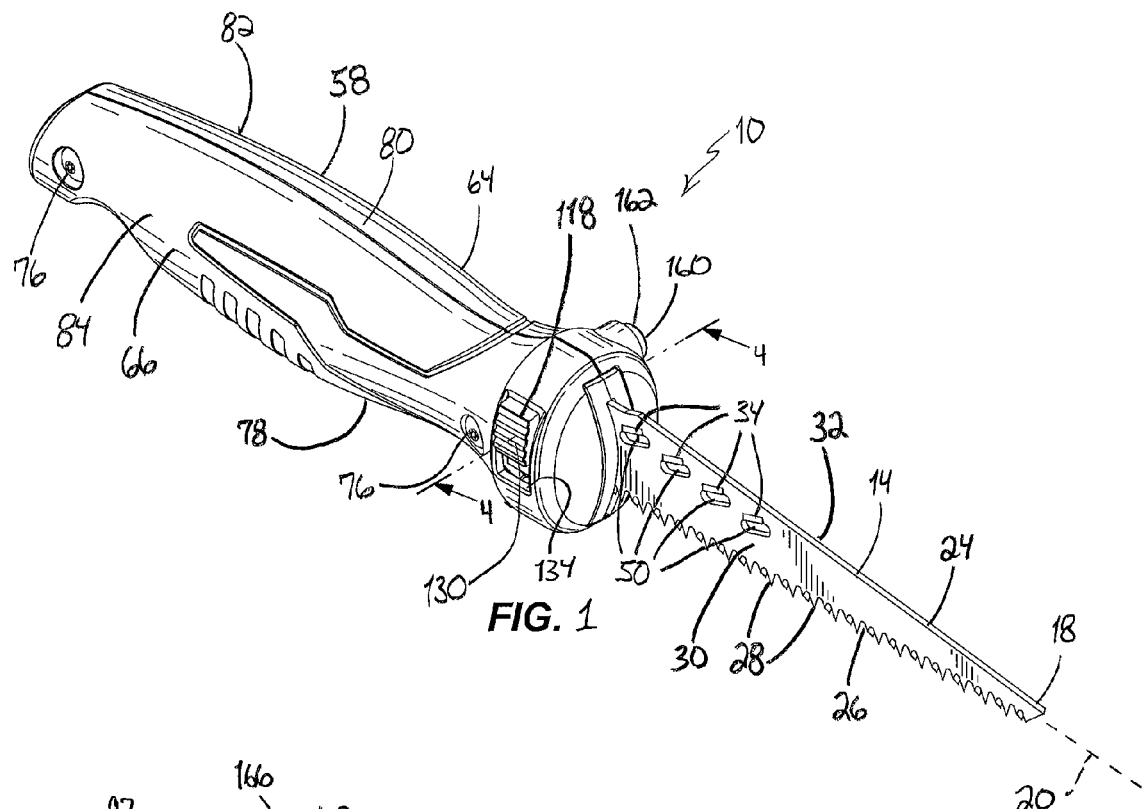
FIG. 1 is a perspective view of a hand saw according to one construction of the invention illustrating a blade of the saw in an extended position.
Figure 2:
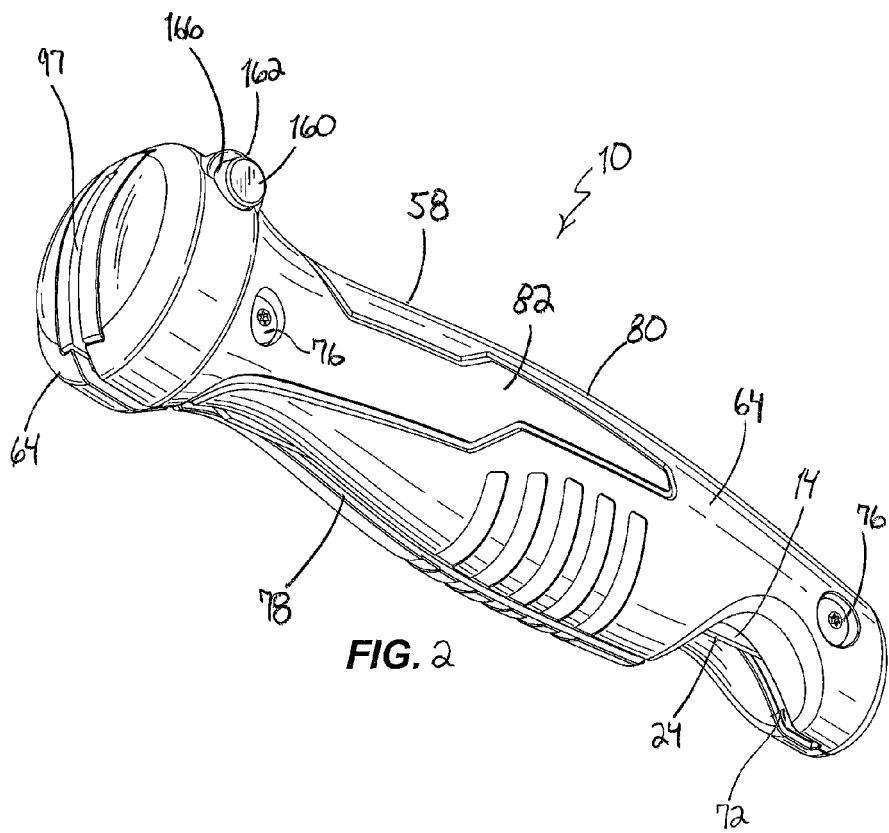
FIG. 2 is a perspective view of the hand saw of FIG. 1 illustrating the blade in a folded position.

FIG. 1 illustrates a hand saw 10, which is a jab saw in the illustrated construction. The saw 10 includes a blade 14 that may be pivoted by the user from an extended position (FIG. 1) to a folded position (FIG. 2). Also, the saw blade 14 can be uncoupled or removed to allow the user to change the saw blade 14.

Figure 3:
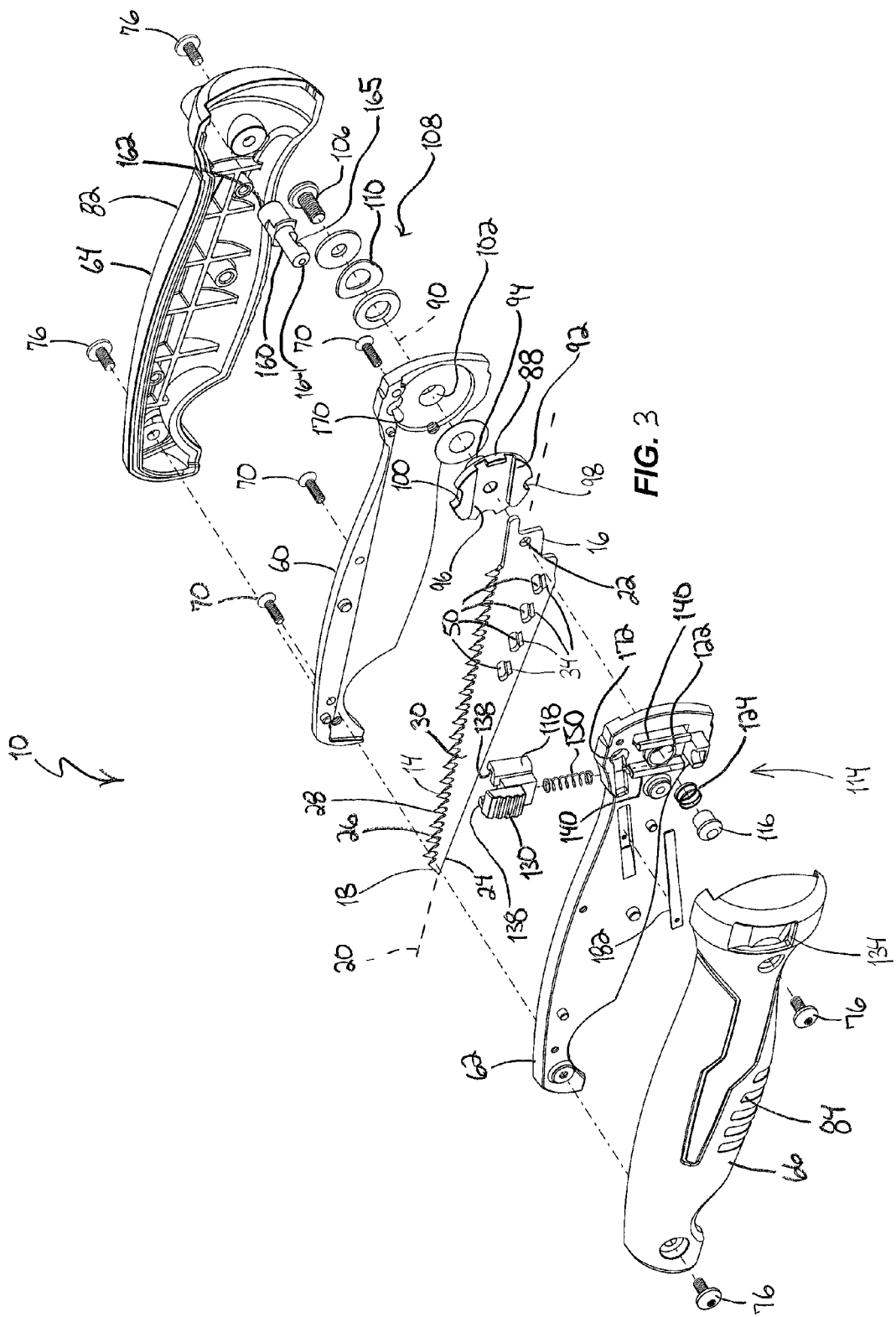
FIG. 3 is an exploded view of the saw of FIG. 1.
Figure 6:
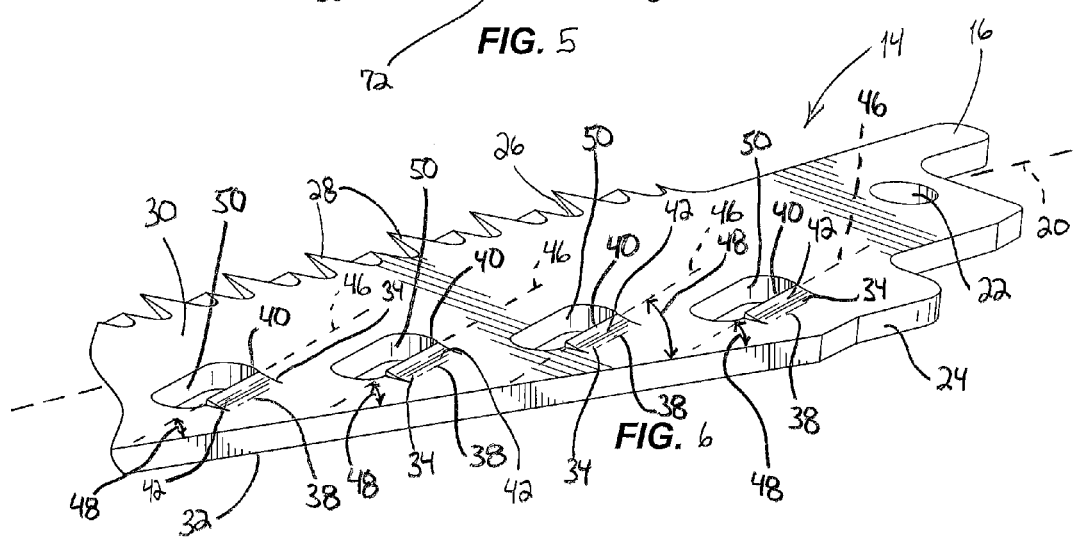
FIG. 6 is an enlarged view of the saw blade of the saw of FIG. 1.

Referring to FIGS. 1, 3, and 6, the saw blade 14 includes a first end 16, a second end 18, and a longitudinal axis 20 that extends through the first end 16 and the second end 18. An aperture 22 extends through the blade 14 adjacent the first end 16, and the aperture 22 is used to couple the blade 14 to the saw 10. The blade 14 further includes a top edge 24 that extends from the first end 16 to the second end 18. A bottom edge 26 extends from the first end 16 to the second end 18 opposite the top edge 24. A plurality of teeth 28 are located along the bottom edge 26, and the teeth 28 are used to cut a workpiece when the blade 14 is reciprocated along the axis 20.

The saw blade 14 further includes a first side wall 30 that extends from the top edge 24 to the bottom edge 26 and from the first end 16 to the second end 18. Likewise, a second side 32, opposite the first side wall 30, extends from the top edge 24 to the bottom edge 26 and from the first end 16 to the second end 18. Elongated projections 34 extend outwardly from the first side wall 30. As best seen in FIG. 6, each of the projections 34 includes a first end 38 and a second end 40. A top surface 42 of each projection 34 is inclined upwardly from the first end 38 to the second end 40 such that the second end 40 forms a cutting edge or end of the projection 34. An axis 46 extends along the length of each cutting edge 40 of the projection 34. The axes 46 are each arranged at an angle 48 with respect to the top edge 24 of the blade 14. In the illustrated construction, the angle 48 is approximately 22 degrees. In other construction, the angle 48 ranges from approximately 15 degrees to approximately 45 degrees.

With continued reference to FIG. 6, in the illustrated construction, an elongated aperture 50 extends through the blade 14 from the first side wall 30 to the second side wall 32 adjacent the cutting edge 40 of each of the projections 34. The projections 34 may be used to rasp a workpiece that was cut by the saw 14. For example, the user may use the teeth 28 to cut an aperture in drywall or sheetrock. After cutting the aperture with the teeth 28, the projections 34 are used to smooth or expand the aperture by moving the first side wall 30 along the cut or aperture. Some of the material removed by the projections 34 passes through the apertures 50, and the apertures 50 facilitate removal of material from the workpiece. Other materials besides drywall and sheetrock could also be rasped using the projections 34.

Figure 7:
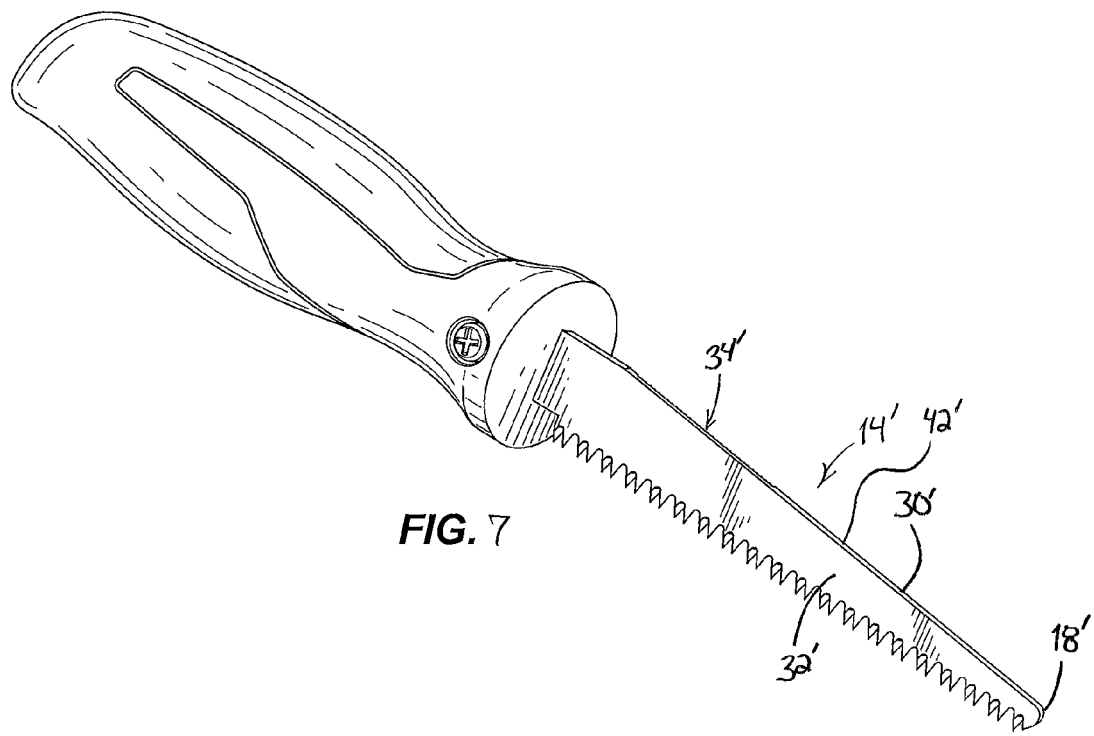
FIG. 7 is a perspective view of a saw according to another construction of the invention.
Figure 8:
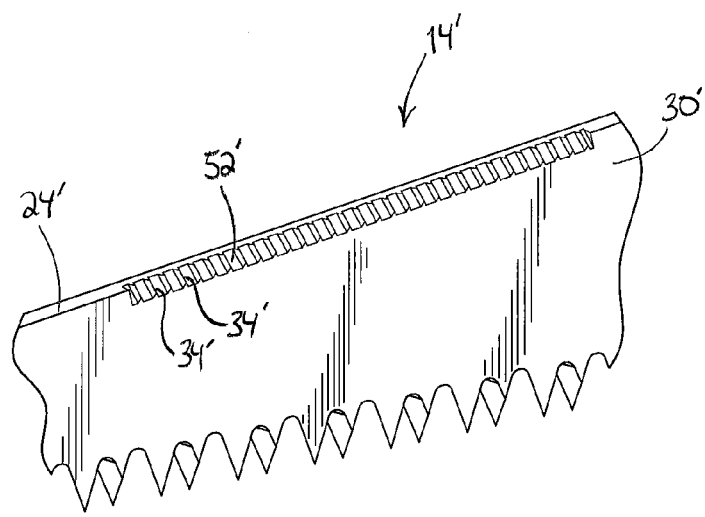
FIG. 8 is an enlarged view of a portion of a saw blade of the saw of FIG. 7.

In other constructions, the projections 34 may be located on other portions of the saw blade 14. For example, although the projections 34 extend only from the first side wall 30, in other constructions, the projections 34 may also extend from the second side wall 32 and the projections 34 may extend only from the second side wall 32 and not the first side wall 30. In yet other constructions, the projections can take other shapes, sizes, and can extend from yet other portions of the blade 14. For example, FIGS. 7 and 8 illustrate a blade 14' according to another construction of the invention. The blade 14' of FIGS. 7 and 8 is similar to the blade 14 of FIG. 1, and therefore, like components have been given like reference numbers with the addition of a prime symbol. Referring to FIGS. 7 and 8, the blade 14' includes an angled surface 52' that extends from the top edge 24' to the first side wall 30'. Projections 34' extend outwardly from the angled surface 52'. The projections 34' are used to rasp a workpiece similar to the projections 34 of FIG. 1 discussed above.

Figure 4:
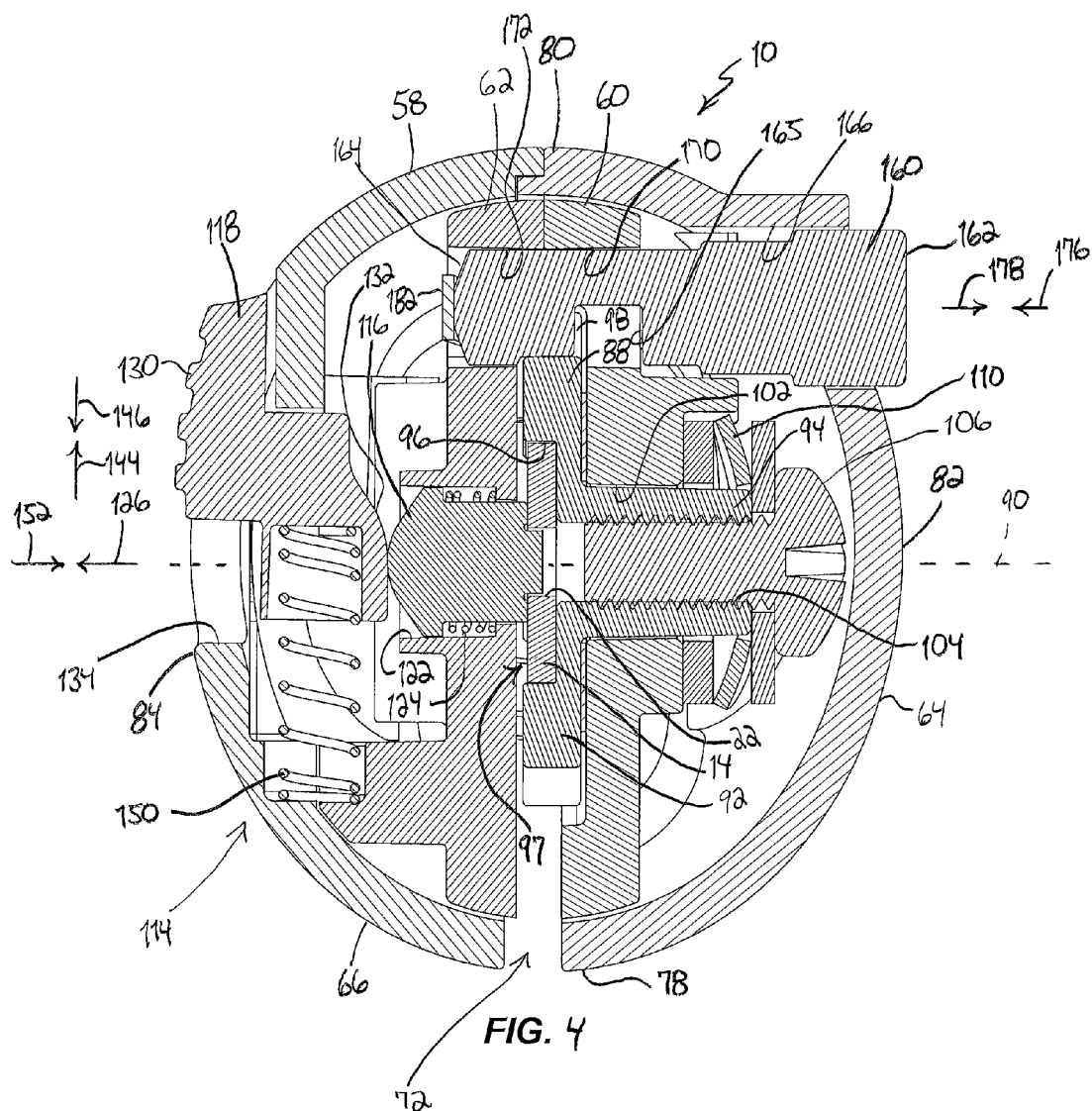
FIG. 4 is a cross-sectional view of the saw of FIG. 1 taken along line 4-4 of FIG. 1 and illustrating an actuating member in an engaged position and a locking member in a locked position.

Referring to FIGS. 1 and 3, the saw 10 further includes a handle 58 that is configured to be grasped by a user to reciprocate the saw blade 14 along the longitudinal axis 20 to cut a workpiece. The illustrated handle 58 includes a first spine 60, a second spine 62, a first cover 64, and a second cover 66. As best seen in FIGS. 1 and 4, the spines 60, 62 provide structural support for components of the saw 10 and the covers 64, 66 are coupled to the spines 60, 62 to generally enclose the spines 60, 62 and provide the user with an ergonomic place to grasp the saw 10.

Referring to FIGS. 3 and 4, the spines 60, 62 are coupled together by fasteners 70, and the spines 60, 62 define an inner cavity 72 that receives the blade 14 when the blade 14 is in the folded position (FIG. 2). The covers 64, 66 are coupled to the spines 60, 62 by fasteners 76. Referring to FIGS. 1 and 2, the covers 64, 66 define a bottom side 78 of the handle 58 that generally faces a workpiece being cut by the blade 14 and a top side 80 that is opposite the bottom side 78. The top side 80 generally faces away from the workpiece. A first side 82 of the handle 58 is defined by the first cover 64 and the first side 82 connects the top side 80 and the bottom side 78. A second side 84, opposite the first side 82, is defined by the second cover 66 and the second side 84 connects the top side 80 and the bottom side 78.

Referring to FIGS. 3 and 4, the saw 10 further includes a blade carrier 88 coupled to the first spine 60 such that the blade carrier 88 pivots with respect to the first spine 60 about a pivot axis 90. The blade carrier 88 includes a plate 92 and a post 94 that extends from the plate 92. A slot 96 is formed in the plate 92 and the slot 96 is configured to receive the first end 16 of the blade 14 to couple the blade 14 to the plate 92. The slot 96 of the plate 92 partially forms a blade receiving slot 97 (FIG. 4) between spines 60, 62 that receives the blade 14. A first notch 98 and a second notch 100 are formed on an outer periphery of the plate 92, the purpose of which will be discussed in more detail below. In the illustrated construction, the notches 98, 100 are directly opposed to each other around the periphery of the plate 92 such that the notches 98, 100 are separated by about 180 degrees.

As best seen in FIG. 4, the cylindrical post 94 extends through an aperture 102 of the first spine 60 so that the blade carrier 88 may rotate about the axis 90 with respect to the spine 60. The illustrated post 94 includes threads 104 and the post 94 receives a threaded fastener 106 to couple the blade carrier 88 to the first spine 60. A set of washers 108 (FIG. 3), which includes a spring washer 110, facilitate rotatably coupling the carrier 88 to the spine 60 via the fastener 106.

Figure 5:
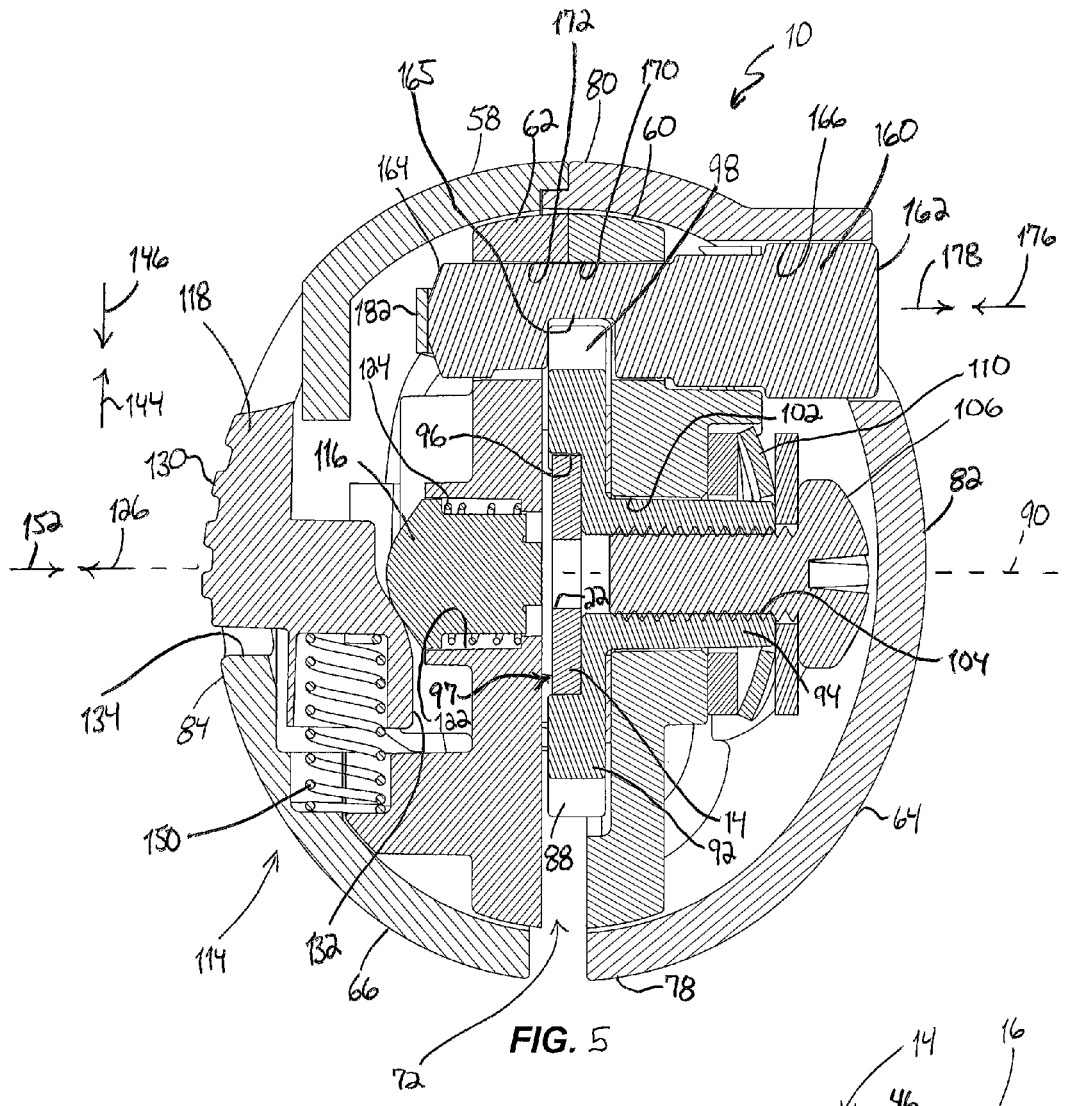
FIG. 5 is a cross-sectional view similar to FIG. 4, but illustrating the actuating member in a disengaged position and the locking member in an unlocked position.

Referring to FIGS. 3 and 4, the saw 10 further includes a blade clamp assembly 114 that removably couples the saw blade 14 to the blade carrier 88. The blade clamp assembly 114 includes a locking member 116 and a release member 118. In the illustrated construction, the locking member 116 is a pin. The pin 116 extends through an aperture 122 in the second spine 62 and into the blade receiving slot 97. The pin 116 is movably coupled to the spine 62 so that the pin 116 may slide in the aperture 122 between a locked position (FIG. 4) and an unlocked position (FIG. 5). A biasing member 124, which is a coil spring in the illustrated construction, biases the pin 116 toward the unlocked position, or in the direction of arrow 126.

Referring to FIG. 4, the release member 118 includes an actuating surface 130 and a cam surface 132. The release member 118 extends through an aperture 134 of the second cover 66 so that the actuating surface 130 is located outside of the cover 66 and the cam surface 132 is located inside the cover 66. Referring to FIG. 3, the release member 118 further includes grooves 138, each of the grooves 138 receiving a track 140 of the second spine 62. The grooves 138 and the tracks 140 guide movement of the release member 118 in the direction of arrows 144, 146. A biasing member 150, which is a coil spring in the illustrated construction, biases the release member 118 in the direction of arrow 144, or in a direction toward the top side 80 of the handle 58. The coil spring 150 biases the release member 118 so that the cam surface 132 forces the pin 116 in the direction of arrow 152 and into the locked position (FIG. 4).

With continued reference to FIGS. 3 and 4, the saw 10 further includes an actuating button 160 to facilitate rotating the blade 14 between the extended and the folded positions. The actuating button 160 includes a first end 162, a second end 164, and a recess 165 between the first end 162 and the second end 164. The actuating button 160 extends through an aperture 166 in the cover 64 so that the first end 162 is accessible by the user and located outside of the cover 64 and the second end 164 is located within the covers 64, 66. The actuating button 160 further extends through an aperture 170 of the first spine 60 and an aperture 172 of the second spine 62. The apertures 170, 172 guide movement of the actuating button 160 between an engaged position (FIG. 4) where the button 160 is received within one of the notches 98, 100 of the blade carrier 88 and a disengaged position (FIG. 5) where the button 160 is disengaged from the notches 98, 100. In the disengaged position, the recess 165 is positioned so that the outer periphery of the carrier plate 92 can rotate within the recess 165. The illustrated actuating button 160 moves generally transverse to the longitudinal axis 20 of the blade 14 between the engaged and the disengaged positions (i.e., in the direction of arrows 176, 178). A biasing member 182, which is a leaf spring in the illustrated construction, biases the actuating button 160 in the direction of arrow 178 or toward the engaged position.

Referring to FIGS. 4 and 5, in operation, to pivot the blade 14 between the folded position (FIG. 2) and the extended position (FIG. 1), the user presses the actuating button 160 in the direction of arrow 176 and against the bias of the leaf spring 182 to move the button 160 from the engaged position (FIG. 4) to the disengaged position (FIG. 5). Then, the user can rotate the blade 14 with respect to the handle 58. Rotation of the blade 14 also rotates the carrier 88 about the pivot axis 90. With the blade 14 in either the extended or the folded position, the user releases the button 160. The spring 182 biases the button 160 in the direction of arrow 178 and back to the engaged position (FIG. 4). In the engaged position, the button 160 engages the carrier 88 to lock or hold the blade 14 and the carrier 88 from rotation with respect to the handle 58 about the pivot axis 90. In the engaged position, the button 160 holds the blade 14 in either the extended position or the folded position. In the illustrated construction, the button 160 engages the notch 98 (FIG. 3) when the blade 14 is in the extended position and the button 160 engages the notch 100 (FIG. 3) when the blade 14 is in the folded position.

If the user desires to change the blade 14, the user presses the release member 118 (using the actuating surface 130) in the direction of arrow 146 against the bias of the spring 150 to move the release member 118 from a locked position (FIG. 4) to a released position (FIG. 5). In the illustrated construction, the release member 118 moves from the top side 80 of the handle 58 toward the bottom side 78 of the handle 58 to move from the locked position to the released position. In other constructions, the release member 118 may be configured so that the release member 118 moves in the opposite direction or from the bottom side 78 of the handle 58 toward the top side 80 of the handle 58 to move from the locked position to the released position.

As the release member 118 moves between the locked position and the released position, the release member 118 slides along the tracks 140 of the second spine 62 (FIG. 3) to move the cam surface 132 with respect to the pin 116. The cam surface 132 is positioned with respect to the pin 116 in the released position so that the pin 116 may then move in the direction of arrow 126 from the locked position (FIG. 4) to the unlocked position (FIG. 5). In the illustrated unlocked position, the pin 116 is positioned out of the blade receiving slot 97 and out of the aperture 22 of the blade 14, which allows the user to pull the blade 14 out of the slot 97. The spring 124 moves the pin 116 to the unlocked position when the release member 118 is in the release position. The user then inserts a new blade 14 into the slot 97 and releases the release member 118. Releasing the member 118 causes the spring 150 to move the release member 118 to the locked position where the cam surface 132 forces the pin 116 to move back to the locked position or in the direction of arrow 152. In the locked position, the pin 116 extends into the aperture 22 of the blade 14 to hold the blade 14 for rotational movement with the carrier 88 and to attach the blade 14 to the saw 10 so that the saw 10 can be used to cut a workpiece.

Although the invention has been described in detail with reference to certain preferred constructions, variations and modifications exist within the scope and spirit of one or more independent aspects of the invention as described.

What is claimed is:
1. A hand saw comprising:
   a saw blade having a first end, a second end, a longitudinal axis that extends through the first end and the second end, and an aperture adjacent the first end;
   a handle configured to be grasped by a user to reciprocate the saw blade along the longitudinal axis to cut a workpiece, the handle defining an inner cavity;
   a blade carrier coupled to the handle such that the blade carrier is pivotable with respect to the handle about a pivot axis, the blade carrier defining at least a portion of a blade receiving slot that receives the first end of the saw blade;
   a blade clamp assembly including a locking member movably coupled to the handle, the locking member extend- ing into the blade receiving slot and at least partially into the aperture of the saw blade to removably couple the saw blade to the blade carrier so that the saw blade pivots with the blade carrier about the pivot axis; and an actuating button manually movable generally transverse to the longitudinal axis of the saw blade by the user between an engaged position and a disengaged position, wherein, in the engaged position of the actuating button, the actuating button engages the blade carrier to retain the blade carrier and the saw blade in one of an extended position and a folded position, wherein in the extended position the saw blade extends from the handle so that the saw blade can be used to cut the workpiece, wherein in the folded position the saw blade is at least partially received within the inner cavity of the handle for storage, wherein, in the disengaged position of the actuating button, the actuating button is disengaged from the blade carrier so that the blade carrier and the saw blade can be pivoted between the extended and the folded positions of the saw blade, wherein the blade carrier includes a plate defining the portion of the blade receiving slot and a post that extends from the plate, wherein the handle includes a spine having an aperture, wherein the post of the plate extends into the aperture of the spine, and wherein the pivot axis extends centrally through the post and the aperture of the spine.

2. The hand saw of claim 1, wherein the blade carrier includes a first notch and a second notch, wherein the actuating button engages the first notch when the actuating button is in the engaged position and the saw blade is in the extended position to retain the saw blade in the extended position, and wherein the actuating button engages the second notch when the actuating button is in the engaged position and the saw blade is in the folded position to retain the saw blade in the folded position.

3. The hand saw of claim 1, wherein the post receives a fastener to couple the blade carrier to the spine.

4. The hand saw of claim 3, wherein the handle further includes a cover coupled to the spine to generally cover the spine and inhibit access to the fastener.

5. The hand saw of claim 1, further comprising a leaf spring that biases the actuating button toward the engaged position.

6. The hand saw of claim 1, wherein the actuating button includes a first end that extends from the handle, a second end located within the handle, and a recess located between the first end and the second end, wherein the first end is configured to be pressed by the user to move the actuating button from the engaged position to the disengaged position to position the recess with respect to the blade carrier so that the blade carrier can rotate within the recess when the actuating button is in the disengaged position.

7. The hand saw of claim 1, wherein the locking member includes a pin movable between a locked position and an unlocked position, wherein the pin extends into the aperture of the saw blade when the pin is in the locked position to couple the saw blade to the blade carrier, and wherein the pin is removed from the aperture of the saw blade when the pin is in the unlocked position to allow the user to remove the saw blade from the blade slot.

8. The hand saw of claim 7, wherein the blade clamp assembly includes a release member having a cam surface, the release member manually movable by the user from a first position to a second position, wherein, in the first position, the cam surface of the release member engages the pin to retain the pin in the locked position, wherein, in the second position, the cam surface is positioned to allow the pin to move to the unlocked position.

9. The hand saw of claim 8, wherein the blade clamp assembly includes a coil spring that surrounds the pin to bias the pin toward the unlocked position.

10. The hand saw of claim 8, wherein the handle includes a spine having a track, wherein the release member is coupled to the track of the spine and the track guides movement of the release member between the first and the second positions.

11. The hand saw of claim 10, wherein the handle further includes a cover coupled to the spine to generally cover the spine, and wherein a portion of the release member extends through the cover.

12. A hand saw comprising:

a saw blade having a first end, a second end, a longitudinal axis that extends through the first end and the second end, an aperture adjacent the first end, and a plurality of teeth configured to cut a workpiece;

a handle configured to be grasped by a user to reciprocate the saw blade along the longitudinal axis to cut the workpiece, the handle including, a bottom side configured to generally face the workpiece when the workpiece is being cut by the saw blade, a top side opposite the bottom side and the top side configured to generally face away from the workpiece when the workpiece is being cut by the saw blade, a first side that connects the bottom side and the top side, and a second side opposite the first side and that connects the bottom side and the top side, a blade carrier coupled to the handle such that the blade carrier is pivotable with respect to the handle about a pivot axis, the blade carrier defining at least a portion of a blade receiving slot that receives the first end of the saw blade;

a blade clamp assembly that includes a locking member and a release member, the locking member extendable into the blade receiving slot and at least partially into the aperture of the saw blade to removably couple the saw blade to the blade carrier so that the saw blade pivots with the blade carrier about the pivot axis, the release member manually movable by the user from a first position to a second position such that in the first position, the release member engages the locking member to retain the locking member in the locked position and in the second position, the locking member is movable to the unlocked position; and an actuating button manually movable by the user between an engaged position and a disengaged position such that in the engaged position the actuating button engages the blade carrier to retain the blade carrier and the saw blade in an extended position or a folded position, and in the disengaged position, the actuating button is disengaged from the blade carrier so that the blade carrier and the saw blade can pivot between the extended and the folded positions of the saw blade, wherein the release member is coupled to the handle such that the release member moves from one of the top side and the bottom side toward the other of the top side and the bottom side when the release member moves from the first position toward the second position, wherein the actuating button is coupled to the handle such that the actuating button moves from the first side toward the second side when the actuating button moves from the engaged position to the disengaged position, wherein the handle further includes a first spine, a second spine, a first cover that defines the first side, and a second cover that defines the second side, wherein the first cover is coupled to the second cover to generally enclose the first spine and the second spine, wherein the first spine includes a track, and wherein the release member is coupled to the track and the track guides movement of the release member between the first and the second positions.

13. The saw of claim 12, wherein the release member extends through the first side of the handle, and wherein the actuating button extends through the second side of the handle.

14. The saw of claim 12, wherein the first spine includes an aperture, wherein the second spine includes an aperture, wherein the actuating button extends at least partially into the aperture of the first spine and the aperture of the second spine to guide movement of the actuating button between the engaged and the disengaged positions.

* * * * *